No. 824,961. PATENTED JULY 3, 1906.
W. T. TEETER.
CULTIVATOR ATTACHMENT.
APPLICATION FILED DEC. 5, 1905.
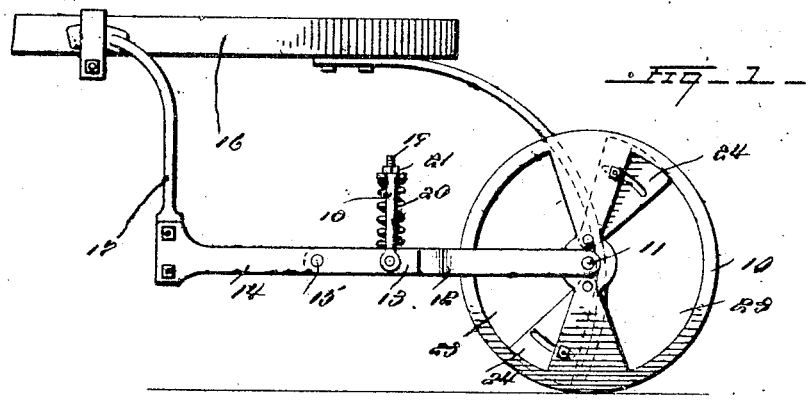
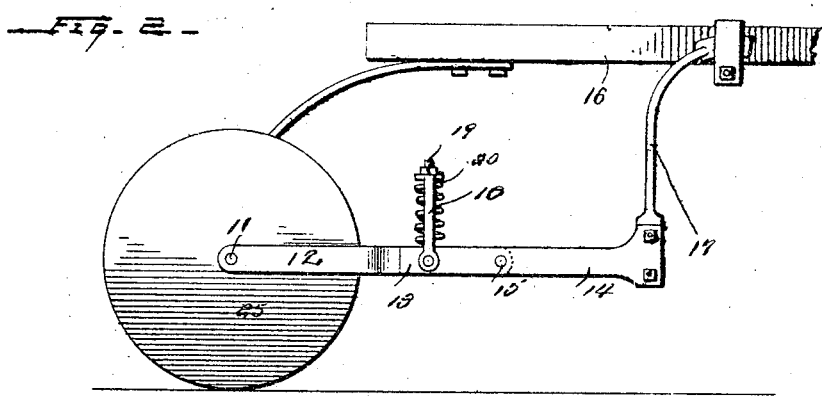
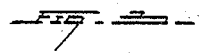
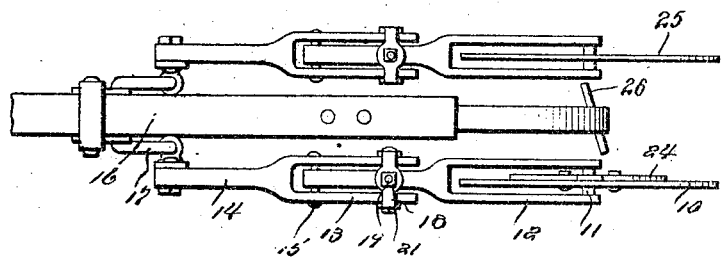
WITNESSES:
INVENTOR
William T. Teeter,
BY
Milo B. Stevens and Co.
Attorneys

UNITED STATES PATENT OFFICE.

WILLIAM THOMAS TEETER, OF ROBERT LEE, TEXAS.

CULTIVATOR ATTACHMENT.

No. 824,961.      Specification of Letters Patent.      Patented July 3, 1906.

Application filed December 5, 1905. Serial No. 290,367.

*To all whom it may concern:*

Be it known that I, WILLIAM THOMAS TEETER, a citizen of the United States, residing at Robert Lee, in the county of Coke and State of Texas, have invented new and useful Improvements in Cultivator Attachments, of which the following is a specification.

My invention is an attachment for cultivators for the purpose of thinning cotton-plants to save chopping.

The attachment is in the nature of a fender, and comprises a disk which is carried by the cultivator and rolls over the ground adjacent the cultivator-shovel. The disk has openings through which soil is thrown on the plants by the shovel when the openings are opposite the latter. When the solid portions of the disk are opposite the shovel, the soil is prevented from being thrown on the plants, whereby gaps are formed in the rows of plants, and they are left in stands. Means are also provided for varying the area of the openings in the disk to regulate the distance between the stands.

In the accompanying drawings, Figure 1 is a side elevation of a cultivator provided with the attachment, only so much of the cultivator being illustrated as will suffice to show the connection of the attachment therewith. Fig. 2 is an elevation taken from the opposite side to that of Fig. 1. Fig. 3 is a plan view.

Referring specifically to the drawings, 10 denotes a disk which is mounted on an axle 11, carried by a forked beam 12. The disk 10 has openings 23 and also carries slides 24, adapted to be swung over said openings to reduce the area thereof. The front end of the beam 12 extends between the forked rear end 13 of a beam 14, being pivotally secured thereto, as at 15. The beam 14 is secured to the cultivator-beam 16 by a hanger 17 or other suitable means.

To the rear end of the beam 14 a yoke-shaped frame 18 is secured, the top of which frame has a hole through which a pin or bolt 19, rising from the front end of the beam 12, extends. A spring 20 is coiled around the pin 19 between the beam 12 and the top of the frame 18. The object of the pivotal connection between the beams 12 and 14 is to allow the disk 10 to adapt itself to variations of the ground. The spring 20 serves to hold the disk to the ground with sufficient firmness to insure continuous rotation by reason of its frictional contact with the ground, which is essential to the successful operation of the device. That portion of the pin 19 which extends above the frame 18 is threaded to receive a nut 21 for regulating the tension of the spring 20. The frame 18 is pivotally secured to the sides of the beam 14, so as to be free to accommodate itself to the swing of the beam 12.

At 25 is indicated a solid disk which is mounted and supported in the same manner as the disk 10 on the opposite side of the beam 16. The two disks are positioned directly opposite each other, with the cultivator-shovel 26 therebetween.

In use the cultivator is driven along the rows of plants in the ordinary manner. Each time the openings 23 are opposite the cultivator-shovel soil is thrown on the plants, and when the solid portions of the disk are opposite the shovel the soil is prevented from being thrown on the plants, so that gaps are formed in the rows of plants, and they are left in stands. By varying the area of the openings the distance between the stands is readily regulated. The solid disk 25 holds the soil and assists to force it through the openings in the disk 10. By thinning the plants as herein described the amount of chopping required is greatly reduced.

I claim—

1. The combination with a cultivator-shovel, of an intermittently-operating movable fender beside the same having openings which by the movement of the fender are intermittently presented opposite the shovel.

2. The combination with a cultivator-shovel, of an intermittently-operating fender beside the shovel having openings, and means for intermittently presenting said openings opposite the shovel.

3. The combination with a cultivator-shovel, of a fender beside the shovel having openings, means for intermittently presenting said openings opposite the shovel, and means to vary the area of said openings.

4. The combination with a cultivator-shovel, of fenders on opposite sides of the shovel, one of said fenders having openings, and means for intermittently presenting said openings opposite the shovel to permit throw of earth therefrom.

5. The combination with a cultivator-shovel, of a rolling disk beside the shovel having openings which by the movement of the disk are intermittently presented opposite the shovel to permit throw of earth therefrom.

6. The combination with a cultivator-shovel, of a rolling disk beside the shovel having openings which by the movement of the disk are intermittently presented opposite the shovel, and slides carried by the disk for varying the area of the openings.

In testimony whereof I have signed my name to this specification in the presence of two subscribing witnesses.

WILLIAM THOMAS TEETER.

Witnesses:
F. K. POPPLEWELL,
W. C. LOCKE.